US007162023B2

(12) United States Patent
Corneliussen et al.

(10) Patent No.: US 7,162,023 B2
(45) Date of Patent: Jan. 9, 2007

(54) SERVICE ORIENTED NETWORKS

(75) Inventors: Knut Snorre Bach Corneliussen, Oslo (NO); Kevin Kliland, Oslo (NO)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 579 days.

(21) Appl. No.: 10/050,043

(22) Filed: Jan. 17, 2002

(65) Prior Publication Data

US 2002/0137494 A1  Sep. 26, 2002

(30) Foreign Application Priority Data

Jan. 18, 2001 (NO) ................................. 20010294

(51) Int. Cl.
  *H04M 1/64* (2006.01)
(52) U.S. Cl. .................. 379/221.01; 370/352
(58) Field of Classification Search .......... 379/221.01; 370/352, 401, 466, 467
  See application file for complete search history.

(56) References Cited

U.S. PATENT DOCUMENTS

| 5,404,396 A | 4/1995 | Brennan |
| 5,517,563 A | 5/1996 | Norell |
| 6,363,065 B1 * | 3/2002 | Thornton et al. ........... 370/352 |
| 6,738,390 B1 * | 5/2004 | Xu et al. .................... 370/467 |
| 6,760,324 B1 * | 7/2004 | Scott et al. ................. 370/352 |

FOREIGN PATENT DOCUMENTS

| EP | 0 869 688 A2 | 10/1999 |
| WO | 97/36430 A1 | 10/1997 |
| WO | 97/40635 A1 | 10/1997 |
| WO | 00/21308 A1 | 4/2000 |
| WO | 00/67443 A2 | 11/2000 |

OTHER PUBLICATIONS

Norwegian Search Report dated Oct. 31, 2001 in corresponding Norwegian application No. 2001 0294.
International Search Report mailed Apr. 26, 2002 in corresponding PCT application No. PCT/NO02/00021.
Lennox et al; "Common Gateway Interface for SIP", Internet Engineering Task Force, Columbia U./Bell Labs, Nov. 13, 1998.
Glassman et al, "Service Architectures in H.323 and SIP-A Comparison".
Lennox et al, "CPL; A Language for User Control of Internet Telephony Service", Internet Draft, Internet Engineering Task Force, IPTEL WG, Columbia University, Nov. 14, 2000.

* cited by examiner

*Primary Examiner*—Gerald Gauthier
(74) *Attorney, Agent, or Firm*—Nixon & Vanderhye, P.C.

(57) ABSTRACT

In a telecommunication system, adapted to provide subscriber related services, a layered architecture including on a service layer a network side service executor and a user terminal service handler is employed. A call is triggered through a user interface provided by the service handler, which conveys a call set-up request and information to the service executor. The service executor communicates directly with a corresponding service executor at a service layer of a destination system and exchanges service information to detect a service interaction problem. A requested call can be established by other signalling and media handler functions when no essential service interaction problem is detected.

8 Claims, 2 Drawing Sheets

SERVICE ORIENTED NETWORKS

TECHNICAL FIELD

This invention relates to a third generation network that provides services to end-users, services such as telephone calls, VPN, multiple access, information services, etc.

BACKGROUND

The H.323 standard of the International Telecommunication Union (ITU) specifies signalling and transport for multimedia traffic over a packet switched network. Another protocol that addresses this same issues as the H.323 standard is referred to as SIP (Session Initiation Protocol) standard.

Network solutions according to H.323 and SIP mainly and typically support multimedia communication between end-points that by some means are connected to a packet-based network, such as for instance an IP (Internet Protocol) network. Networks and end-points that support H.323 or SIP (or, are given this support via other means, such as e.g. an H.323 or SIP enabled gateway), can provide services and functions as can be found in a typical PSTN (Public Switched Telephone Network). Accordingly, depending on the capabilities of the end-point, such networks can support and provide to a user more than plain voice communication. Other examples of supported communication types are video, fax, data sharing, information services, etc.

Telecommunication solutions according to H.323 or SIP will typically support the same type of services as those provided by a normal PSTN. Such services are call forwarding, call waiting, call screening, etc. Because H.323 and SIP telecommunication solutions are using new network architectures, such as e.g. based on IP, and have support for smarter end-points than PSTN, a new sets of services will be supported in those networks.

Although H.323 and SIP are new protocols, telecommunication solutions according to those protocols will encounter problems with regard to service interaction similar to those experienced in the PSTN. A reason for the occurrence of a service interaction problem is that some services are invoked when an end-user establishes a call. This means that services are applied after some of the routing of a call is already done, which in turn can lead to adverse interaction of a service or services.

In the following and with reference to the accompanying FIG. 1, a typical known service solution in a typical telecommunication network, as will be readily appreciated by a person skilled in the art, will be explained by way of a model description.

In FIG. 1 the normal network model is shown. It should be noted that the reference numerals only give an indication on the normal or typical call path flow, as other call path scenarios also are known to exist:

1: The services are configured by a network operator and potentially also by an end user 2: The call is triggered at the user side and signalling handler on the user side communicates with the signalling handler on the network side 3: The service executor is invoked 4: The service executor communicates with the service configuration part in order to download information on e.g. available services 5: The service executor returns service information to the signalling handler, that might be ordinary PSTN services like CLIP (Calling Line Identity Presentation)/CLIR (Calling Line Identity Restriction), PNP (Private Numbering Plan), OCB (Outgoing Call Barring) etc.

6: The signalling flow can be "flooded" to the terminating side (the "reflected side")

7: When the signalling part is executed, information on which media channels to set up are passed over to the media generator.

Accordingly, the media is set up through the network. Note that media and signalling usually do not follow the same paths. Note also that the "reflection plane" indicated in FIG. 1 illustrates that the originating side may or may not see a "mirrored" or "reflected" terminating side that is similar to the originating side.

The service configuration and service executor shown in FIG. 1 can also exist on the user side. The advantage of having the service configuration and service executor on the network side is that the operator is given fill control over the service environment and all possible interactions between services.

U.S. Pat. No. 5,822,419 to Enstone, et al., discloses a method of detecting interactions between services in a set of services in a telecommunications system. A service abstract is produced based on a Basic Call State Model (BCSM) which gives a high level description of a Call Processing Subsystem and a data processing sequence performed by basic call processing and by the services in respect of a global data item. For detecting service interactions, a service abstract is produced based on a Basic Call State Model and a data processing sequence performed by basic call state processing and by the services in respect of a global data item.

European Patent publication no. EP0825787 to British Telecomm (GB) discloses, in a connection management system for setting up connections in a communications network, run-time negotiation is carried out to avoid feature interaction. Users of the network are provided with user agents (intelligent software) who have access to user profiles. When a calling user wants to set up a particular connection configuration, which may involve service features such as ring back later on busy, their user agent sends a connection configuration proposal to the user agent or a called user. The two user agents then negotiate to establish a mutually acceptable connection configuration, if one is available. The negotiation is based on alternative connection configurations stored in order of preference in the respective user profiles. These are proposed and counter-proposed by the user agents in descending preference order until the mutually acceptable configuration is reached or the connection fails.

Patent publication no. WO9750232 to Bell Communications Res (US) discloses a method for managing communications between a service origination node and a plurality of serving nodes where the serving nodes are simultaneously active for a particular trigger to thereby generate a reply to the service origination node. The method includes the step of determining control options for each trigger indicative of service categories by capturing service interaction principles supplied by a serving node services expert acting as a mentor. The service interaction principles are based upon a requirement of executing service categories in each of the serving nodes for each trigger. The method also includes the step of controlling execution of each of the service nodes and the service categories for the particular trigger with reference to the control options to generate the reply.

Patent publication no WO9429993 to TELEFON AB L M ERICSSON (SE), discloses a method of avoiding undesirable interferences between services in a telecommunications system that includes basic software for a basic service and supplemental software for services supplemental to the basic service. The supplemental software is divided into action software, which acts solely on the basic service, and supplemental software, which acts on the remaining supplemental software. A supplemental service is represented by action elements. Combinations of action elements form nodes in a mathematical binomial tree. Only those combinations, which correspond to interference, i.e., an undesirable behaviour, between supplemental services will form a number of structures, called interference event trees. Before a supplemental service can be executed, its action elements are compared with nodes in the interference event trees, with the intention of ascertaining whether or not the former coincide with action elements belonging to the nodes in the latter. Only those interference event nodes whose sets of action elements are equivalent with the set of action elements of the supplemental service or a set thereof are selected. An interference event node whose set of action elements is a subset of the action elements of a node that has already been chosen cannot be selected. Interaction software belonging to selected nodes in the interference event trees is added to the basic software.

It is an object of the invention to provide an improved solution in a modem telecommunication network for mitigation of service interaction or service conflict problems that may occur when conflicting services pertinent to a subscriber are invoked.

It is a further object of the invention to provide an improved solution in a modem telecommunication network for mitigation of network load problems resulting from service interaction or service conflict problems.

DETAILED DESCRIPTION OF EMBODIMENTS

In the following the invention will be explained in more detail, by way of example and with reference to the accompanying drawings.

Figure 1:
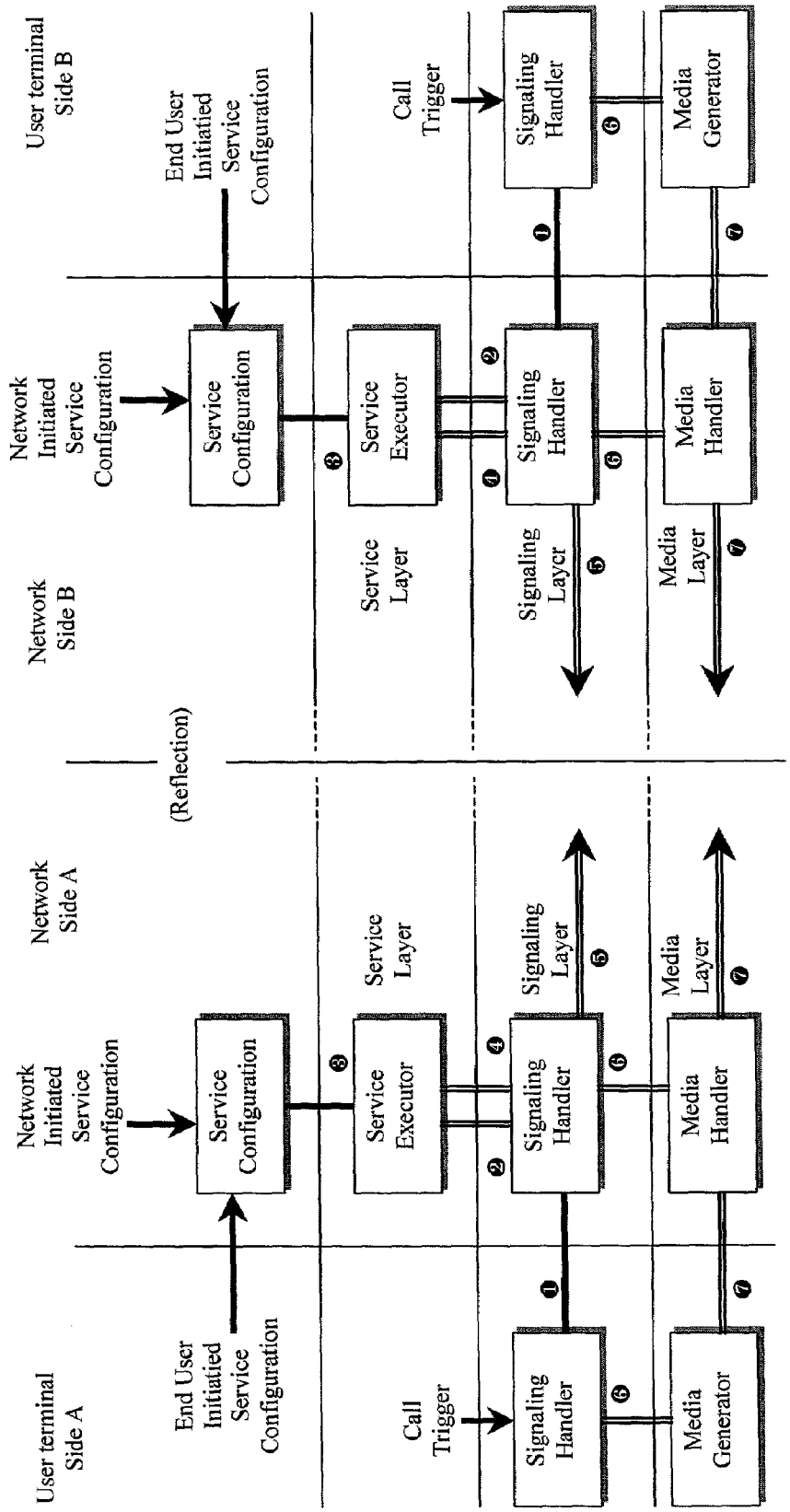
FIG. 1. is a schematic drawing illustrating a typical known call path scenario, with sequence illustrated by numbers.
Figure 2:
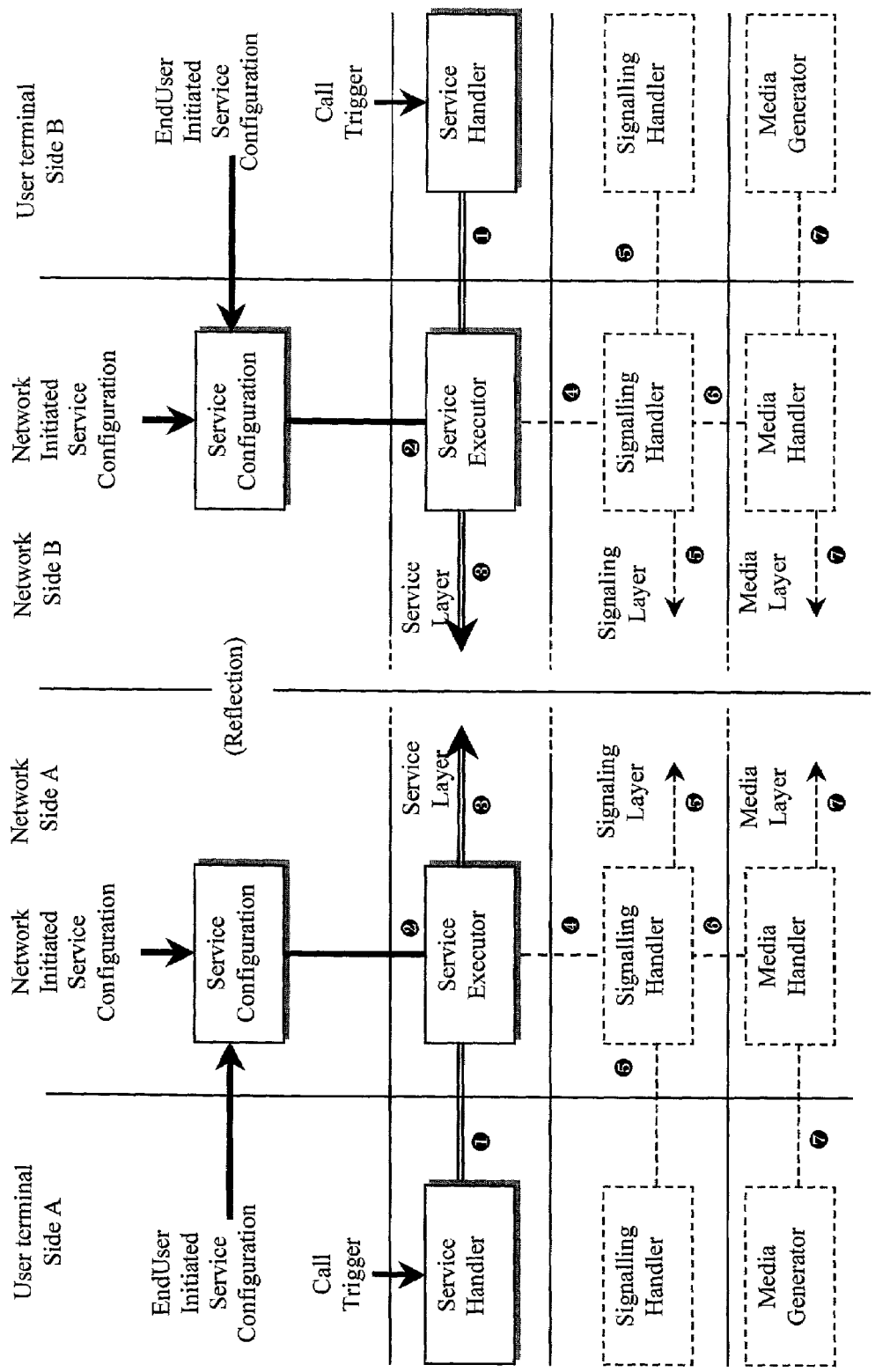
FIG. 2. is a schematic drawing illustrating an exemplary call path scenario according to the invention.

Referring to FIG. 2, instead of starting call from the signalling layer and through the media layer as is common according to current solutions as illustrated in FIG. 1, in a solution according to the invention the call is started at the service layer. This means that the service layer on the user side and the service layer on the network side will communicate directly. It will then be the service layer on the network side that informs the signalling handler on the signalling layer on the network side to establish the call. After the service executor on the originating side has been informed about the destination of the call and has performed applicable local services, it routes the call to the service executor on the destination side. When the destination side service executor has finished executing it's services, dependent upon network architecture, either the originating side service executor or the destination side executor will inform the media executor to start the call.

In reference numeral order, in the following is given a detailed explanation of the various items shown in FIG. 2. As different call path scenarios can exist in a solution according to the present invention, it should be noted that the order in which of the references numerals appear only give an indication of one of a number of possible call path flows, that is likely to occur:

1: The services are configured by a network operator, and possibly also by an end user 2: The call is triggered at the user side and the associated service executor on the network side is informed 3: The service executor communicates with the service configuration part in order to download available information, such as e.g. information on available services.

4: The service information can be flooded to the terminating (destination) side (i.e. the "reflected" side.)

It should be noted, that, in a solution according to the invention, the signalling handlers and generators are eliminated on the network side as well as on the user side. They are not needed because call routing and transport of service information is done on the service layer.

Although the Signalling handler, the media generator and the media handler shown in FIG. 2 are depicted by dotted lines, they are still present. They are, however, involved in the service execution. When one or more services are executed at the Service Executors, the service executors inform the signalling handler at the network side to initiate the call (point 4 in FIG. 2), but the rest of the call set-up follows the normal procedure as described in the applicable standard call control protocol (e.g. H.323 or SIP). Accordingly, in the actual call handling between, the difference between the solutions indicated by FIGS. 1 and 2, respectively, is that in FIG. 2 it is only the signalling handler at the network side that is allowed to initiate calls, such as e.g. sending Q.931 "Set-up" according to H.323 or "SIP-Invite" according to SIP.

Further, with reference to FIG. 2, after the Service executor has informed the signalling handlers to initiate the call in step 4, the signalling handlers at the network side initiate the call towards the signalling handler at the user side (step 5 in FIG. 2). The signalling protocol can be of any standard type (e.g. H.323 or SIP), adapted such that the call initiation is only allowed from the network side. When the signalling is complete, the signalling handler informs the media handler that it is able to receive or send information, as indicated in step 6. Both the network and the user side are now ready to receive media, as indicated in step 7.

Referring to the solution illustrated in FIG. 2, and comparing it with the known solution illustrated in FIG. 1, it can be seen that the novel solution further represents an extension represented by a service handler. As depicted, the service handler represents the users access to the network, and represents the point at which the user will initiate a call. Because a call, in the novel solution, is considered equal to any other service, and hence is separated from the actual signalling that is used to establish calls, a requirement for this is that the service handler is able to communicate with the network side service handler over a simple standard protocol, such as for example HTTP (hypertext transport protocol). Accordingly, the service handler at the user side does not communicate with the signalling handler at the user side.

The service executor at the network side in a solution according to the invention, of which an exemplary model representation is illustrated by FIG. 2, can be seen to differ in two ways from the service executor shown in FIG. 1:

a) The service executor (shown in FIG. 2) receives service-triggering information directly from a service handler located at the user side instead of a triggering service from the signalling handler at the network side. That means that the service executor at the network side must have support for a protocol that is understood by the service handler at the user side. A simple protocol like http should be used.

b) The service executor at one network talks directly with a service executor in another network (in this context and at this point, the meaning of network is the service executor handling services for a different user or domain), instead of communicating indirectly through the standard call control signalling (as shown in FIG. 1). The protocol used between the different service executors should be optimised according to the services that are supported. Because most of the information sent on this communication link is data related, a data protocol will be used, where XML (extended Mark-up Language) over http could be one example of such a protocol.

In FIG. 2, the new scenario in a solution according to the invention is drawn by solid lines. However, the novel way of invoking services may still invoke "old" services of existing solutions, which can be included, as shown, by the features illustrated in FIG. 2 by dotted lines. If "old" services are invoked, the service executor preferably is designed with a backend and different frontends, depending on which protocol to interface to.

If several networks provided by different network providers or ISPs are involved, there must exist some standard protocols on the service layer; see reference numeral 3 in FIG. 2.

The protocols used for configuring the services as well as on the service execution layer typically can advantageously be HTTP.

ADVANTAGES

Provides a solution to the service interaction problem.

Eliminates the need for standardising the way originating and terminating services are "talking" to each other, as they communicate directly and not via the media layer.

Eliminates the need for a special and often quite complex call handling protocol.

ABBREVATIONS

| | |
|---|---|
| IP | Internet Protocol |
| ISP | Internet Service Provider |
| LAN | Local Area Network |
| PSTN | Public Switched Telephone Network |
| VPN | Virtual Private Network |
| WAN | Wide Area Network |
| WAP | Wireless Application Protocol |
| WML | Wireless Mark-up Language |

REFERENCES

[1] ITU-T Recommendation H.323, February 1998 "Packet-based multimedia communications system".

[2] WAP white paper, June 99,

[3] Session Initiation Protocol—SIP IETF RFC 2543,

The invention claimed is:

1. A service oriented telecommunication system, said service oriented telecommunication system adapted to provide a basic call service for call set-up, maintenance and tear-down and a subscriber specific supplementary service to a system associated subscriber, for detecting and preventing a possible subscriber specific supplementary service conflict due to a call setup request, said system conforming to a layered system model comprising a service layer, a signaling layer and a media layer, said system organized with a user terminal side and a network side, and adapted to provide a subscriber specific supplementary service to a system associated subscriber operating from a user terminal associated with a user terminal side subscriber specific supplementary service handler element residing in the signaling layer and being operatively associated with a network side subscriber specific supplementary service executor element residing in the service layer, wherein the user terminal side subscriber specific supplementary service handler element includes a user interface means allowing an originating user to generate an originating call setup request, and adapted to convey via a first service layer path to said network side subscriber specific supplementary service executor element a call service request message including said originating call set-up request with call set-up information specifying a destination user, the network side subscriber specific supplementary service executor element being adapted:

to exchange via a second service layer path, originating user related and destination user related service information, with a corresponding network side subscriber specific supplementary service executor element residing in a service layer of a corresponding service oriented telecommunication system of said destination user, to detect a subscriber specific supplementary service interaction conflict on basis of said service information, and to convey the call setup request to a network side signalling handler element residing in the signalling layer of the service oriented telecommunication system in response to an analysis result indicating no conflict and to convey a conflict indicating message to the service handler in response to an analysis result indicating a conflict, and the network side signalling handler element being adapted to convey call information to a network side media handler residing in said media layer and being adapted to handle media corresponding to a call setup.

2. A system according to claim 1, further comprising:

a user terminal side subscriber specific supplementary service configuration element in communication with said network side subscriber specific supplementary service executor element and being adapted to convey subscriber specific supplementary service configuration information to said network side subscriber specific supplementary service executor element.

3. A system according to claim 1, where the call set-up request signalling is according to H.323 or SIP.

4. A service oriented telecommunication system, said service oriented telecommunication system adapted to provide a basic call service for call set-up, maintenance and tear-down and a subscriber specific supplementary service to a system associated subscriber, for detecting and preventing a possible subscriber specific supplementary service conflict due to a call setup request, said system conforming to a layered system model comprising a service layer, a signalling layer and a media layer, and adapted to provide a subscriber specific supplementary service to a system associated subscriber operating from a user terminal, said system comprising in the service layer on a user terminal side a user terminal subscriber specific supplementary service handler element and on a network side a subscriber specific supplementary service executor element, in the signalling layer at least one signalling handler element and in the media layer at least one media handler element, wherein said service handler element being operatively associated with said subscriber specific supplementary service executor element said subscriber specific supplementary service executor element being adapted to communicate with the signalling handler element and to communicate via a service layer path with a corresponding network side subscriber specific supplementary service executor element of a further service oriented telecommunication system, said signalling handler element adapted to communicate with the media handler element, wherein the user terminal side subscriber specific supplementary service handler element being adapted to provide a user operable call trigger user interface adapted to directly forward on a call trigger input to the network side subscriber specific supplementary service executor element a call service request message including a call set-up request and said network side subscriber specific supplementary service executor element being adapted to convey to the signalling handler element call set-up request signalling on basis of information provided in the call set-up request forwarded by the user terminal side subscriber specific supplementary service handler element, thereby providing a means for controlling a call set-up between user terminals of said system, or between said system and said corresponding system, on basis of a predetermined subscriber specific supplementary service before involving said signalling handler or said media handler in a call set-up process.

5. A system according to claim 4, further comprising a user terminal side subscriber specific supplementary service configuration element in communication wit said network side subscriber specific supplementary service executor element and being adapted to convey subscriber specific supplementary service configuration information to said network side subscriber specific supplementary service executor element.

6. A system according to claim 4, wherein the call set-up request signalling is according to H.323 or SIP.

7. A method of initiating and processing a call setup request for detecting and preventing a possible service conflict, due to the call setup request, in a service oriented telecommunication system being adapted to provide a basic call service for call set-up, maintenance and tear-down and a subscriber specific supplementary service to a system associated subscriber, said system including a originating side terminal side subscriber specific supplementary service handler element in communication with an originating side network side subscriber specific supplementary service executor element, an originating side network side signalling handler element in communication with said originating side network side subscriber specific supplementary service executor element, and an originating side network side media handler element in communication with an originating side network side signalling handler element, said method comprising providing by a call originator via a originating side terminal side subscriber specific supplementary service handler element user interface a call service request input including call service information, conveying said call service request from said originating side terminal side subscriber specific supplementary service handler element to said originating side network side subscriber specific supplementary service executor element, exchanging call originator call service information and call destination service information between said originating side network side subscriber specific supplementary service executor element and a corresponding destination side network side subscriber specific supplementary service executor element, evaluating in said originating side network side subscriber specific supplementary service executor clement said call originator subscriber specific supplementary service information and said call destination subscriber specific supplementary service information to detect a subscriber specific supplementary service interaction problem, and, if no subscriber specific supplementary service interaction problem is detected sending call setup request signalling from said originating side network side subscriber specific supplementary service executor element to said originating side network side signalling handler element, or, if a subscriber specific supplementary service interaction problem is detected, sending from said originating side network side subscriber specific supplementary service executor element to said originating side terminal side subscriber specific supplementary service handler element information indicating the subscriber specific supplementary service interaction problem.

8. The method of claim 7, further comprising:

establishing by said originating side terminal side signalling handler element, said originating side network side signalling handler element, and a corresponding destination side network side signalling handler element, on basis of said call setup request signalling, a call having an associated media channel, and, then, exchanging media between said originating side media handler element and corresponding destination side media handler element via said media channel.

* * * * *

UNITED STATES PATENT AND TRADEMARK OFFICE
CERTIFICATE OF CORRECTION

PATENT NO. : 7,162,023 B2  Page 1 of 1
APPLICATION NO. : 10/050043
DATED : January 9, 2007
INVENTOR(S) : Knut Snorre Bach Corneliussen et al.

It is certified that error appears in the above-identified patent and that said Letters Patent is hereby corrected as shown below:

In Column 2, Line 17, delete "fill" and insert -- full --, therefor.

In Column 3, Line 25, delete "modem" and insert -- modern --, therefor.

In Column 3, Line 30, delete "modem" and insert -- modern --, therefor.

In Column 5, Line 58, after "June 99" delete "," and insert -- . --, therefor.

In Column 5, Line 59, after "2543" delete "," and insert -- . --, therefor.

In Column 7, Line 32, in Claim 5, delete "wit" and insert -- with --, therefor.

In Column 8, Line 22, in Claim 7, delete "clement" and insert -- element --, therefor.

In Column 8, Line 29, in Claim 7, after "detected" insert -- , --.

Signed and Sealed this

Tenth Day of June, 2008

JON W. DUDAS
*Director of the United States Patent and Trademark Office*